(12) United States Patent
Winter et al.

(10) Patent No.: US 8,150,321 B2
(45) Date of Patent: Apr. 3, 2012

(54) NEAR FIELD RF COMMUNICATORS AND NEAR FIELD COMMUNICATIONS ENABLED DEVICES

(76) Inventors: Ian Winter, Swinoon (GB); Alastair Lefley, Kemble (GB); Robin Wilson, Cirencester (GB)

( * ) Notice: Subject to any disclaimer, the term of this patent is extended or adjusted under 35 U.S.C. 154(b) by 511 days.

(21) Appl. No.: 12/377,627

(22) PCT Filed: Aug. 15, 2007

(86) PCT No.: PCT/GB2007/003101
§ 371 (c)(1),
(2), (4) Date: Feb. 23, 2009

(87) PCT Pub. No.: WO2008/020198
PCT Pub. Date: Feb. 21, 2008

(65) Prior Publication Data
US 2010/0167644 A1   Jul. 1, 2010

(30) Foreign Application Priority Data
Aug. 16, 2006   (GB) .................................. 0616331.5

(51) Int. Cl.
*H04B 5/00* (2006.01)
*H04B 7/00* (2006.01)
(52) U.S. Cl. ...... 455/41.2; 455/41.1; 375/140; 375/150; 375/362
(58) Field of Classification Search .................. 455/41.1
See application file for complete search history.

(56) References Cited

U.S. PATENT DOCUMENTS

| 6,265,788 B1* | 7/2001 | Davidson et al. ............... 307/11 |
| 2002/0132585 A1* | 9/2002 | Palermo et al. .................. 455/41 |
| 2004/0113847 A1* | 6/2004 | Qi et al. ........................ 343/702 |
| 2006/0052055 A1* | 3/2006 | Rowse et al. ................ 455/41.1 |

FOREIGN PATENT DOCUMENTS

| DE | 10025992 A1 | 1/2002 |
| EP | 1107472 A | 6/2001 |
| EP | 1431904 A2 | 6/2004 |
| GB | 2406475 A | 3/2005 |
| GB | 2421663 A | 6/2006 |
| GB | 2422517 A | 7/2006 |
| GB | 2424349 A | 9/2006 |
| GB | 2441051 B | 9/2008 |
| WO | 2006054070 A1 | 5/2006 |
| WO | 2006095186 A1 | 9/2006 |
| WO | 2007135434 A1 | 11/2007 |

OTHER PUBLICATIONS

UK Intellectual Property Office; Search Report for Application No. GB0616331.5; Nov. 3, 2006; 1 page.
UK Intellectual Property Office; Search Report for Application No. GB0715941.1; Dec. 11, 2007; 2 pages.

\* cited by examiner

*Primary Examiner* — Ryan Jager
(74) *Attorney, Agent, or Firm* — Sterne, Kessler, Goldstein & Fox P.L.L.C.

(57) ABSTRACT

A near field RF communicator has: an antenna operable to generate an RF signal to enable inductive coupling via the magnetic field of the RF signal between the antenna and another near field RF communicator or RF transponder in near field range; and a signal generator operable to generate a multi-level digital sine wave drive signal to drive the antenna to generate the RF signal, wherein the signal generator comprises a selector operable to select one or more digital sequences to provide one or more digital signals from which the digital sine wave drive signal is generated.

20 Claims, 6 Drawing Sheets

NEAR FIELD RF COMMUNICATORS AND NEAR FIELD COMMUNICATIONS ENABLED DEVICES

CROSS REFERENCE TO RELATED APPLICATIONS

This application is a national stage application under 35 USC 371 of International Application No. PCT/GB2007/003101, filed Aug. 15, 2007, which claims the priority of United Kingdom Application No. 0616331.5, filed Aug. 16, 2006, the contents of which are herein incorporated by reference.

FIELD OF THE INVENTION

This invention relates to Near Field RF communicators and devices comprising such communicators.

BACKGROUND OF THE INVENTION

Near field RF (radio frequency) communication requires an antenna of one near field RF communicator to be present within the alternating magnetic field (H field) generated by the antenna of another near field RF communicator by transmission of an RF signal (for example a 13.56 Mega Hertz signal) to enable the magnetic field (H field) of the RF signal to be inductively coupled between the communicators. The RF signal may be modulated to enable communication of control and/or other data. Ranges of up to several centimeters (generally a maximum of 1 meter) are common for near field RF communicators.

Near field communication in the context of this application may be referred to as near-field RF communication, near field RFID (Radio Frequency Identification) or near field communication. The range of such devices depends on the antenna used but may be, for example, up to 1 meter. A near field RF communicator may be, as examples: an initiator near field RF communicator (such as a near field RFID transceiver or RFID reader) that is capable of initiating a near field RF communication (through transmission or generation of an alternating magnetic field) with another near field RF communicator; a target near field RF communicator (such as an RF transponder or tag) that is capable of responding to initiation of a near field RF communication by another near field RF communicator; or an NFC communicator that is capable of being both an initiator and target and that in an initiator mode is capable of initiating a near field RF communication (through transmission or generation of an alternating magnetic field) with another near field RF communicator and in a target mode is capable of responding to initiation of a near field RF communication by another near field RF communicator.

Communication of data between NFC communicators may be via an active communication mode in which the NFC communicator transmits or generates an alternating magnetic field modulated with the data to be communicated and the receiving NFC communicator responds by transmitting or generating its own modulated magnetic field, or via a passive communication mode in which one NFC communicator transmits or generates an alternating magnetic field and maintains that field and the responding NFC communicator modulates the magnetic field to which it is inductively coupled with the data to be communicated, for example by modulating the load on the inductive coupling ("load modulation"). Near field RF communicators may be actively powered, that is have an internal or associated power source, or passively powered, that is derive a power supply from a received magnetic field. Generally an RF transceiver will be actively powered while an RF transponder may be passively or actively powered.

Examples of near field RF communicators are defined in various standards for example ISO/IEC 18092 and ISO/IEC 21481 for NFC communicators, and ISO/IEC 14443 and ISO/IEC 15693 for near field RF communicators.

Near field RF communicators may be provided as standalone or discrete devices or may be incorporated within or coupled to or otherwise associated with larger electrical devices or host devices (referred to below as near field RF communications enabled devices) to enable those devices to communicate by the near field with other near field RF communicators or devices incorporating or coupled to such near field RF communicators. When incorporated within a larger device or host, a near field RF communicator may be a discrete entity or may be provided by partly or wholly by functionality within the larger device or host. Examples of such larger devices or host devices are, for example, cellular telephone devices, portable computing devices (such as personal digital assistants, notebooks, lap-tops), other computing devices such as personal or desk top computers, computer peripherals such as printers, or other electrical devices such as portable audio and/or video players such as MP3 players, IPODs®, CD players, DVD players, consumer products such as domestic appliance or personal care products, and other electrical or electronic devices, apparatus or systems. Some areas of application are payment systems, ticketing systems, for example in tickets (for example parking tickets, bus tickets, train tickets or entrance permits or tickets) or in ticket checking systems, toys, games, posters, packaging, advertising material, product inventory checking systems and so on.

To initiate near field RF communication, a near field RF communicator must transmit an RF signal at the required frequency. The transmitted RF signal is then modulated with data. Such modulation may include, for example amplitude modulation, where the amplitude of the transmitted RF signal is varied in accordance with the data to be transmitted and communication protocol in operation. Relatively complex modulation and driver circuitry may be required to produce the modulated RF signal to be transmitted.

SUMMARY OF THE INVENTION

In a first aspect of the present invention, there is provided a near field RF communicator comprising a signal selector and an antenna circuit, the signal selector being operable to select at least one digital sequence to cause the antenna circuit to produce a corresponding RF signal. In an embodiment, the signal selector is operable to select from a plurality digital sequences and to select first and second digital sequences to cause the antenna circuit to produce a corresponding modulated RF signal.

In a second aspect of the present invention, there is provided a near field RF communicator comprising a digital sequence provider and antenna circuitry, the digital sequence provider being operable to provide a digital representation of a waveform, generally a sinusoidal waveform, on the basis of one or more digital sequences and to cause the antenna to produce the waveform. Modulation may be achieved by selecting from a plurality of different digital sequences. In an embodiment, the waveform comprises a modulated RF signal and the one or more digital sequences are selected in accordance with instructions and/or data to be communicated by the near field RF communicator.

In a third aspect of the present invention, there is provided a near field communicator comprising antenna circuitry, a data store storing at least one digital sequence, a controller operable to use the at least one digital sequence to generate at least one digital signal to cause the antenna circuitry to provide an output signal, generally an RF signal comprising one or more sine waves. Generally the memory stores a plurality of digital sequences.

In an embodiment, a said digital sequence comprises a repeating pattern, for example an 8, 16 or 24 digit repeating pattern.

According to a fourth aspect of the present invention there is provided a near field RF communicator comprising: an antenna operable to generate an RF signal to enable inductive coupling via the magnetic field of the RF signal between the antenna and another near field RF communicator in near field range; and a signal provider operable to provide a multi-level digital signal, which may approximate or represent a sine wave, to cause the antenna to generate the RF signal.

In one embodiment the signal provider is operable to generate the digital signal as a discretised representation of an oscillatory waveform with a sampling frequency greater than the frequency of the oscillatory waveform.

In one embodiment the signal provider is operable to generate a digital signal that represents a sine wave and the antenna is operable to generate a sine wave RF signal.

In one embodiment the signal provider is operable to generate the digital signal as a discretised representation of an oscillatory waveform with a sampling frequency greater than the frequency of the oscillatory waveform so that the discretised representation comprises series of increasing signal levels alternating with series of decreasing signal levels.

In one embodiment the sampling frequency is 8, 16 or 24 times the frequency of the oscillatory waveform.

In one embodiment the signal provider comprises a selector operable to select one or more digital sequences to provide the digital signal.

In one embodiment the selector is operable to select and multiplex digital sequences representing different signal amplitudes to effect amplitude modulation.

In one embodiment the selector is operable to select respective digital sequences to represent corresponding amplitude modulation levels.

BRIEF DESCRIPTION OF THE DRAWINGS

Embodiments of the present invention will now be described, by way of example, with reference to the accompanying drawings, in which.

As used herein the term digital sequence means a sequence of two-state or binary data values and the term digital signal means a signal with a plurality of discretised (or quantized) levels.

With reference to the drawings in general, it should be understood that any functional block diagrams are intended simply to show the functionality that exists within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hard-wired elements, software elements or firmware elements or any combination of these. The near field RF communicator may be provided wholly or partially as an integrated circuit or collections of integrated circuits.

DETAILED DESCRIPTION OF THE INVENTION

Figure 1:
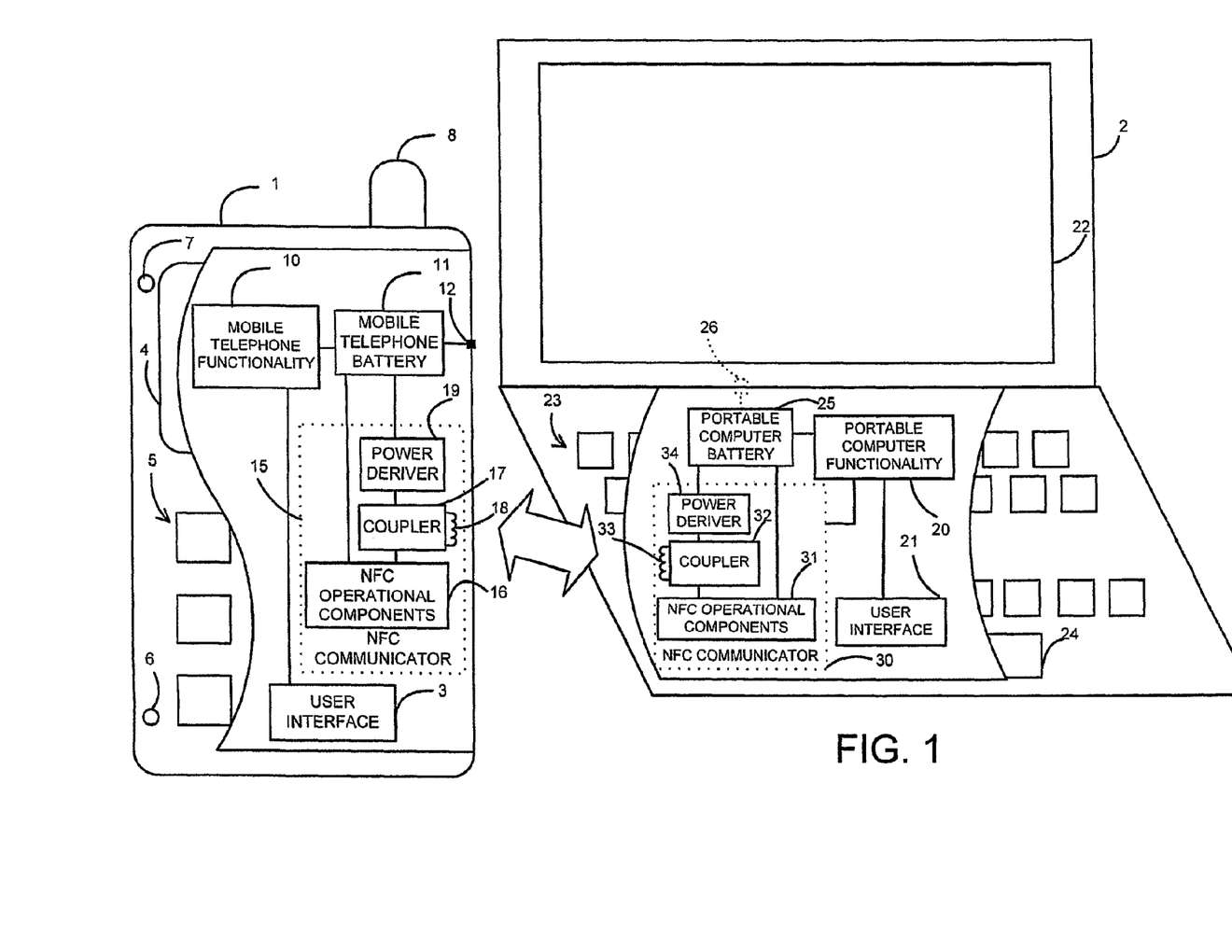
FIG. 1 shows a representational diagram illustrating communication between two near field RF communications enabled devices.

Referring now specifically to FIG. 1, there is shown a representational diagram illustrating communication between two near field RF communications enabled devices. In FIG. 1 the representations of the near field RF communications enabled devices have been show partly cut-away and the functionality provided by the near field RF communications enabled devices illustrated by way of a functional block diagram within the near field RF communications enabled device.

As shown in FIG. 1, one near field RF communications enabled device comprises a cellular telephone device 1 and the other near field RF communications enabled device comprises a portable computer 2 such as a notebook or laptop computer.

The cellular telephone device 1 has the usual features of a cellular telephone including cellular telephone functionality 10 (in the form of, usually, a programmed controller, generally a processor or microprocessor with associated memory or data storage, for controlling operation of the cellular telephone in combination with a SIM card), an antenna 8 for enabling connection to a mobile telecommunications network, and a user interface 3 with a display 4, a keypad 5, a microphone 6 for receiving user voice input and a loudspeaker 7 for outputting received audio to the user. The cellular telephone device also has a chargeable battery 11 coupled to a charging socket 12 via which a mains adapter (not shown) may be connected to enable charging of the battery 11. The cellular telephone device 1 may have an alternative or additional power supply (not shown), for example a reserve battery or emergency battery. The cellular telephone device may be a standalone cellular telephone (mobile telephone or cellphone) or may comprise a device such as a computer, for example a notebook, laptop or PDA, having cellular telephone functionality.

Similarly, the portable computer 2 has the usual features of a portable computer including portable computer functionality 20 in the form of, usually, a processor with associated memory in the form of ROM, RAM and/or hard disk drive, one or more removable media drives such as a floppy disk drive and/or a CDROM or DVD drive, and possibly a communications device for enabling the portable computer to connect to a network such as the Internet. The portable computer 2 also includes a user interface 21 including a display 22, a keyboard 23 and a pointing device, as shown a touchpad 24. The portable computer 2 also has a chargeable battery 25 coupled to a charging socket 26 via which a mains adapter (not shown) may be connected to enable charging of the battery 25.

In addition, as shown in FIG. 1, both near field RF communications enabled devices 1 and 2 have a near field RF communicator 15 and 30. In FIG. 1 the communicators are, for example, NFC communicators. As shown, the NFC communicators 15 and 30 are incorporated within the larger devices and, as with the other functional blocks, may be discrete entities within the host devices or may be provided by features dispersed throughout or integrated within the host device or a part of the host device.

Each NFC communicator 15 and 30 comprises NFC operational components 16 and 31 for, as will be described below, enabling control of the NFC functionality and generation, modulation and demodulation of an RF signal. Each NFC communicator 15 and 30 also comprises an inductive coupler 17 and 32 comprising an inductor or coil in the form of an antenna 18 and 33. The inductive couplers 17 and 32 enable an alternating magnetic field (H field) generated at the antenna 18 (or 33) of one near field communicator 15 (or 30) by transmission of an RF signal (for example a 13.56 Mega Hertz signal) to be inductively coupled to the antenna 33 (or 18) of the other near field communicator 30 (or 15) when that antenna is within the near field of the RF signal generated by the one near field communicator 15 (or 30).

The NFC communicators 15 and 30 are coupled to the cellular telephone device and portable computer functionality 10 and 20, respectively, to enable data and/or control commands to be sent between the NFC communicator and the host device and to enable user input to the NFC communicator. Communication between the user interface 3 or 21 and the NFC communicator 15 or 30 is via the host device functionality 11 or 20, respectively.

Each of the NFC communicators 15 and 30 has a power provider 19 and 34. The power providers 19 and 34 may be, for example, batteries such as button cell or other small batteries. Alternatively or additionally, as shown by the dashed lines in FIG. 1, the power providers 19 and 34 may comprise couplings to the host batteries 11 and 25 and/or may be coupled to derive power from an RF signal inductively coupled to the NFC communicator.

It will be appreciated that FIG. 1 shows only examples of types of host devices. Other examples of such host devices are, for example, personal digital assistants, notebooks, other computing devices such as personal or desk top computers, computer peripherals such as printers, or other electrical devices such as portable audio and/or video players such as MP3 players, IPODs®, CD players, DVD players. Further examples of such larger devices or host devices are other electrical or electronic products, for example consumer products such as domestic appliance or personal care products, and other electrical or electronic devices, apparatus or systems.

It will also be appreciated that rather than an NFC communicator, one of near field RF communicators 15 and 30 may instead comprise a near field RF transceiver (in which case the other communicator will be a near field RF transponder or NFC communicator).

Also, rather than being incorporated within the host device, the near field RF communicator 15 or 30 may be associated with the host device, for example by a wired or wireless coupling that is capable of power transfer. In such a case, a housing of the NFC communicator may be physically separate from or may be attached to the housing of the host device; in the later case, the attachment may be permanent once made or the NFC communicator may be removable. For example, the near field RF communicator may be housed within: a housing attachable to another device; a housing portion, such as a fascia of the NFC communications enabled device or an other device; an access card; or may have a housing shaped or configured to look like a smart card. For example a near field RF communicator may be coupled to a larger device by way of a communications link such as, for example, a USB link, or may be provided as a card (for example a PCMCIA card or a card that looks like a smart card) which can be received in an appropriate slot of the larger or host device.

As another possibility, one or both of the near field RF communications enabled devices may be a standalone near field RF communicator, that is they may have no functionality beyond their near field RF communications functionality.

Figure 2:
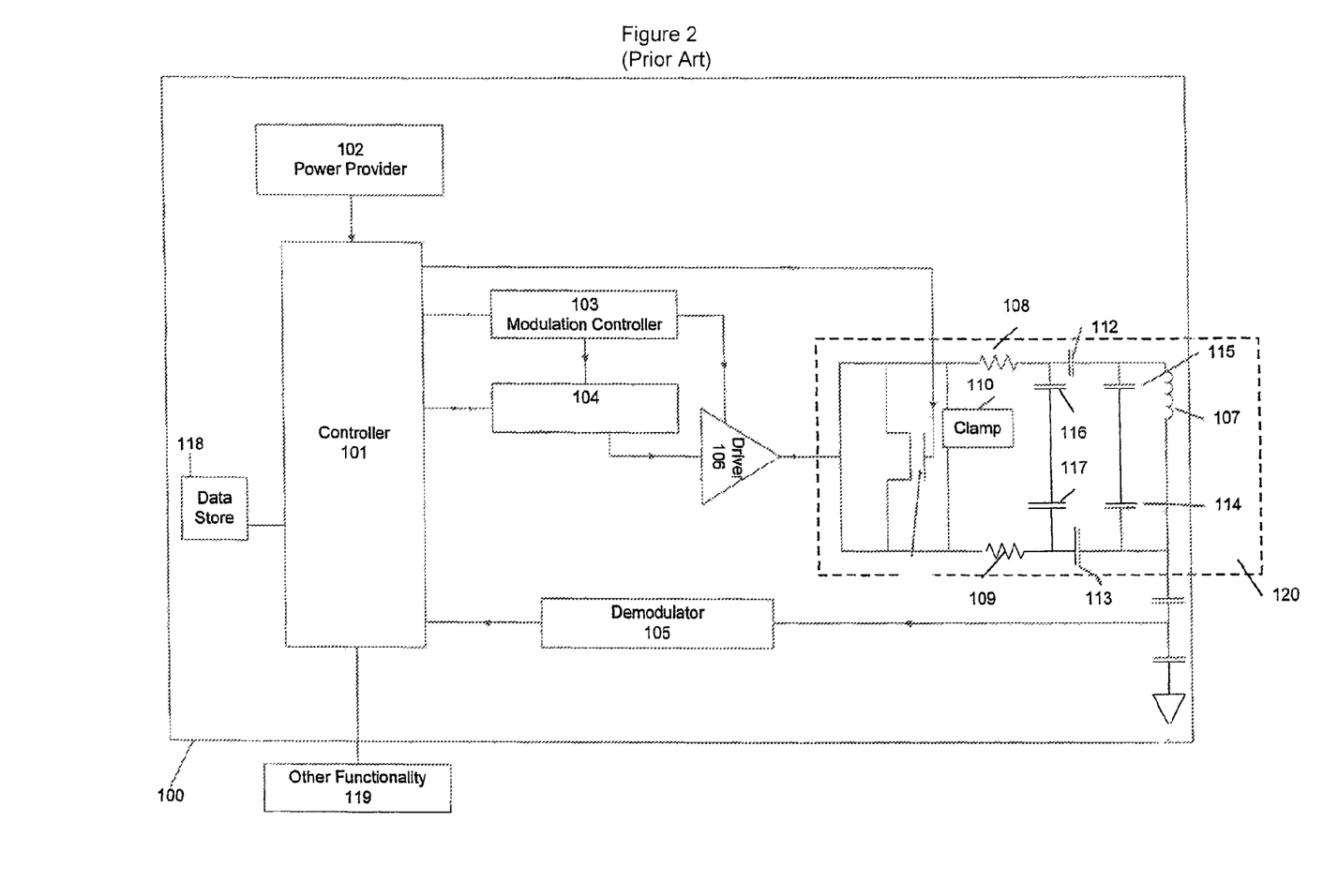
FIG. 2 shows a functional block diagram of a NFC communicator not falling within the scope of the claims.

FIG. 2 shows a functional block diagram of a prior art near field RF communicator.

The near field RF communicator 100 comprises operational components (103-118) and a power provider 102 and is shown as an NFC communicator.

The NFC communicator 100 may or may not also have or be capable of being connected or coupled with at least one of other functionality 119 (for example functionality of a host device such as described above or a user interface). The nature of such other functionality 119 and/or user interface will depend on the type of NFC communicator and the host device (if any) to which it is attached.

The operational components comprise a controller 101 for controlling overall operation of the NFC communicator. The controller 101 is coupled to a data store 118 for storing data (information and/or control data) to be transmitted from and/or data received by the NFC communicator. The controller 101 may be a microprocessor, for example a RISC processor or other microprocessor or a state machine. Program instructions for programming the controller and/or control data for communication to another near field RF communicator may be stored in an internal memory of the controller and/or the data store 118 and/or other functionality (119).

The operational components also comprise a demodulator 114 coupled between the antenna circuit 120 and the controller 101 for demodulating a modulated RF signal inductively coupled to the antenna circuit 120 from another near field RF communicator in near field range and for supplying the thus extracted data to the controller 101 for processing.

Data is communicated between near field RF communicators by modulation of the RF signal inductively coupled between the antenna circuit 120 and the antenna circuit of a second near field RF communicator within near field range. Any suitable form of modulation scheme may be used for communication, for example FSK (Frequency Shift Key) modulation, PSK (Phase Shift Key) modulation, PDM (Pulse Density Modulation), ASK (Amplitude Shift Key) modulation, or load modulation. The modulation scheme used will depend on the communications protocol and program data within controller 101 (or alternatively within other functionality 119) and the mode of operation of the NFC communicator 100.

NFC communicators such as that shown in FIG. 2 may operate in an initiator or a target mode. When in initiator mode it acts as an initiator of communication with a target compatible near field RF communicator or near field RF communications enabled device and when in target mode it acts as a target for an initiator NFC device or near field RF communications enabled device. The mode may be determined by the controller 101 or may be determined in dependence on the nature of a received near field RF signal or in accordance with other functionality 119. As thus used, compatible means operable at the same frequency and in accordance with the same protocols, for example in accordance with the protocols set out in various standards such as ISO/IEC 18092, ISO/IEC 21481, ISO/IEC 14443 and ISO/IEC 15693. Communication may be in accordance with an active protocol under which the initiator and target each generate their own RF field when communicating data and then turn off that RF field to await data communication from the other or in accordance with a passive protocol under which the initiator transmits and maintains its RF field throughout the entire communication.

When load modulating a received RF signal (for example when the NF communicator is operating in target and passive modes), the NFC communicator 101 changes the impedance of the antenna circuit 120 in accordance with the data to be communicated, and thus of the antenna circuit of the inductively coupled near field RF communicator supplying the RF signal. In the example shown, a change in impedance is be effected by the controller 101 controlling operation of the transistor 111.

The NFC communicator shown in FIG. 1 is also capable (for example when the NFC communicator is acting as an initiator) of initiating communication by supplying its own RF signal which will generally be a modulated RF signal. The operational components in the NFC communicator therefore also include a signal provider 104 for providing an RF signal to be supplied to the antenna circuit 120 via a driver 106. The signal provider may be separate from or part of the controller 101. The signal provider may actually generate the RF signal or may receive the RF signal from an RF signal provider provided by a host of the NFC communicator.

The signal provider 104 is operable, under the control of the controller 101 or modulation controller 103, to modulate the supplied RF signal in accordance with data and/or instructions to be communicated. Modulation controller 103 may also control characteristics of the modulation, for example the type and/or modulation depth of modulation carried out by the signal provider 104. For example, in order to control the modulation depth where amplitude modulation is used, the modulation controller 103 may control the amplitude of the RF signal supplied by the signal provider 104 and/or the amplitude of the output of the driver 106.

The modulation controller 103 may, as shown, be separate from the controller or may form an integral part of the controller 101. Also, the modulation functionality of the signal provider 104 may be separate from rather than integral with the signal generation functionality.

Figure 2A:
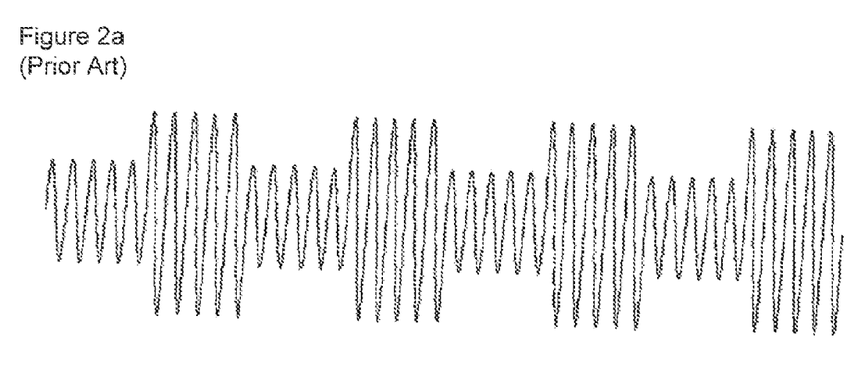
FIG. 2a shows the antenna circuit output waveform generated by the NFC communicator shown in FIG. 2.

The digital square wave signal supplied by the driver 106 is filtered and smoothed by the components of the antenna circuit 120 to generate the required RF signal which has a sinusoidal waveform. The filtering and smoothing is carried out by a series of inductors and capacitors 112-117. The number of inductors and capacitors required will depend on the particular NFC communicator and requirements of the antenna circuit 120. A clamp 110 may be used to reduce the risk of damage due to out-of-range voltages, for example to reduce the risk of damage to any integrated circuitry. FIG. 2a shows an example of a modulated output signal supplied by the antenna circuitry of FIG. 2.

In the example shown in FIG. 2a, amplitude modulation is used. It will, however, be appreciated that other forms of modulation may be used, for example frequency modulation, pulse code modulation or phase shift key. The modulation of the digital square wave signal requires relatively complex circuitry.

Figure 3:
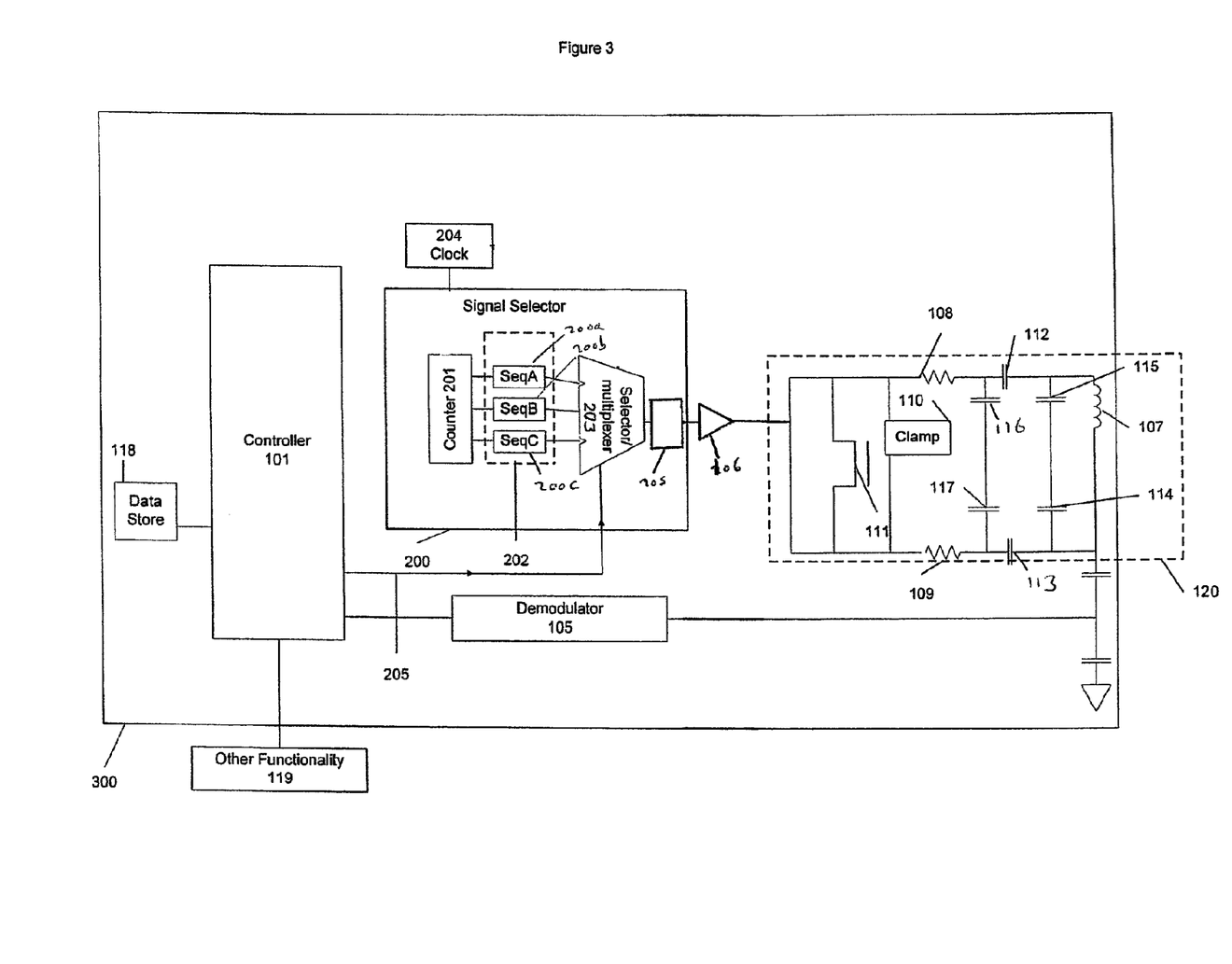
FIG. 3 shows a functional block diagram of a first example of a near field RF communicator embodying the invention.

FIG. 3 shows an example of an NFC communicator in accordance with the invention which avoids the need for the relatively complex modulation circuitry discussed above.

Components of the NFC communicator shown in FIG. 3 that have the same functionality as corresponding components of the NFC communicator shown in FIG. 2 have been allotted the same reference numeral and their functionality will not be explained in detail again.

As can be seen by comparing FIGS. 2 and 3, instead of the modulation circuitry 103 and 104 or 101 and 104 of FIG. 2, the NFC communicator 300 comprises a signal selector 200 which generates a digital signal or combination of digital signals in accordance with the data to be transmitted by the NFC communicator, and as supplied by the controller (line 205).

The signal selector 200 has a data store 202 for storing a plurality of binary (two-level) digital sequences, a counter 201 for controlling reading out of the digital sequences in accordance with a clock 204 and a selector/multiplexer 203 for selecting digital sequences, a binary to multi-level converter 205 for generating a multi-level signal (which will in a preferred embodiment represent a sine wave) from the binary output of selector/multiplexer 203 and where appropriate combining the resulting multi-level signals. The binary to multi-level converter 205 may be a serial digital to analogue converter that provides an output that changes in a stepwise manner with each binary input value, for example one of the binary one and binary zero may cause a step increase and the other a step decrease, as will be explained below with reference to FIG. 5.

Generation of a digital signal by the signal selector 200 depends on the generation of a plurality of digital sequences. There may simply be two digital sequences to represent different amplitude sine waves but, as an example, FIG. 3 shows digital sequences "Seq A", "Seq B" and "Seq C" 202a, 202b and 202c. The availability of three digital sequences enables different modulation requirements to be met. For example, use of sequences A and B may achieve a 50% modulation whereas use of sequences A and C may achieve 10% modulation. Further digital sequences may enable further different modulation depths to be achieved. Alternatively, there may be sequences for each mode of operation plus each relevant amplitude modulation requirement.

Each digital sequence represents a different digital signal and therefore a different output waveform. The digital sequences are generated in advance and are dependent on the required antenna output waveform. The signal data store may, as shown, be within the signal selector 200 or may be within the controller 101, the data store 118 or a separate memory facility (not shown). The stored digital sequences effectively form a look-up table for the signal selector 200, enabling it to select from the stored digital sequences according to any given set of circumstances.

In one example, the clock 204 is an 8× clock which clocks at a rate of eight times the carrier frequency (that is the carrier frequency is oversampled by a factor of eight) each digital sequence has an eight digit length, and the counter is a modulo-eight counter. In this example, the modulo-eight counter, under the control of the clock 204, clocks out the digital sequences such that each digital sequence repeats once for every carrier frequency cycle. Example digital sequences A1 and B1 may be as follows:

| Counter | Sequence A1 | Sequence B1 |
| --- | --- | --- |
| 1 | 1 | 1 |
| 2 | 1 | 1 |
| 3 | 1 | 0 |
| 4 | 0 | 0 |
| 5 | 0 | 0 |
| 6 | 0 | 0 |
| 7 | 1 | 1 |
| 8 | 0 | 1 |

In the above example the sequence length is the same as the oversampling factor. The sequence length may be the same as or different from the oversampling factor. The sequence length may be any integer multiple of the oversampling factor.

Figure 4:
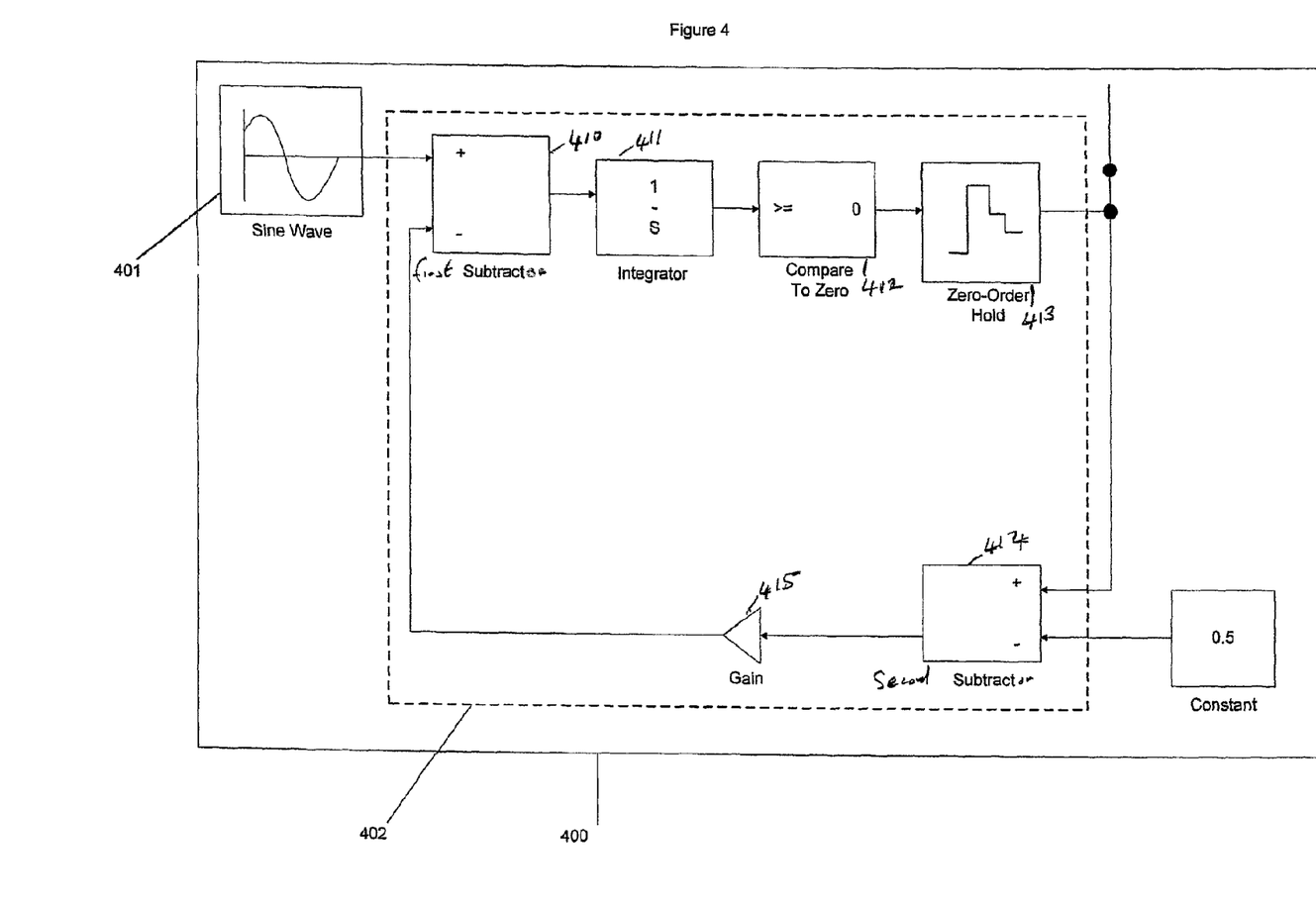
FIG. 4 shows a functional block diagram of a test bench which can be used to generated digital sequences in accordance with the invention.

The digital sequences may be generated by any suitable mathematical function generator or in accordance with any suitable encoding rubric. For example such digital sequences may be generated knowing the required output waveform on a MATLAB® test bench. An example test bench is shown in FIG. 4. The test bench 400 takes a sample sine wave 401 and feeds it into a control loop with negative feedback 402.

In the example shown in FIG. 4, control loop 402 comprises a first subtractor 410, an integrator 411, a compare to zero device 412, a zero order hold 413, a second subtractor 414 and a gain device 415. The first subtractor computes the error between the desired sine wave (normalised to have a maximum value of 1) and the waveform caused by a generated digital sequence. The integrator performs a mathematical function on the subtraction result (the error). For example, if the error were constant at 0.5V, the integrator would convert this into a rising slope of 0.5V per second. The longer the error is positive, the longer the rising slope continues, and the larger the integrator output. The compare to zero device outputs a one or a zero depending on whether the output of the integrator is positive or negative. The zero order hold functions as a logical flip flop to synchronises its output with a given clock frequency—upon each rising or falling clock pulse, the output of the zero order hold is changed to the value of its input at that point. In the case of 24× over-sampling, the zero order hold synchronises at 24 times the frequency of the sine wave which creates a sequence 24 samples long. The zero order hold consequently outputs the computed digital sequence. The computed digital sequence is feedback through the second subtractor which, for example, converts a sequence of {0, 1, 0} into {−0.5, +0.5, −0.5}. The gain device multiplies its input signal by a factor of two such that it converts a sequence of {−0.5, +0.5, −0.5} into {−1, +1, −1}. Accordingly, the output of the gain device has a minimum value of −1 and a maximum value of +1, which are the same minimum and maximum of the desired sine-wave.

Using the test bench the properties of the incoming sine wave can be varied, resulting in different digital sequences being generated. For example, the amplitude of the sine wave may be varied, to simulate amplitude modulation. This enables generation of the digital sequences necessary to provide the required modulated output waveform.

Figure 5:
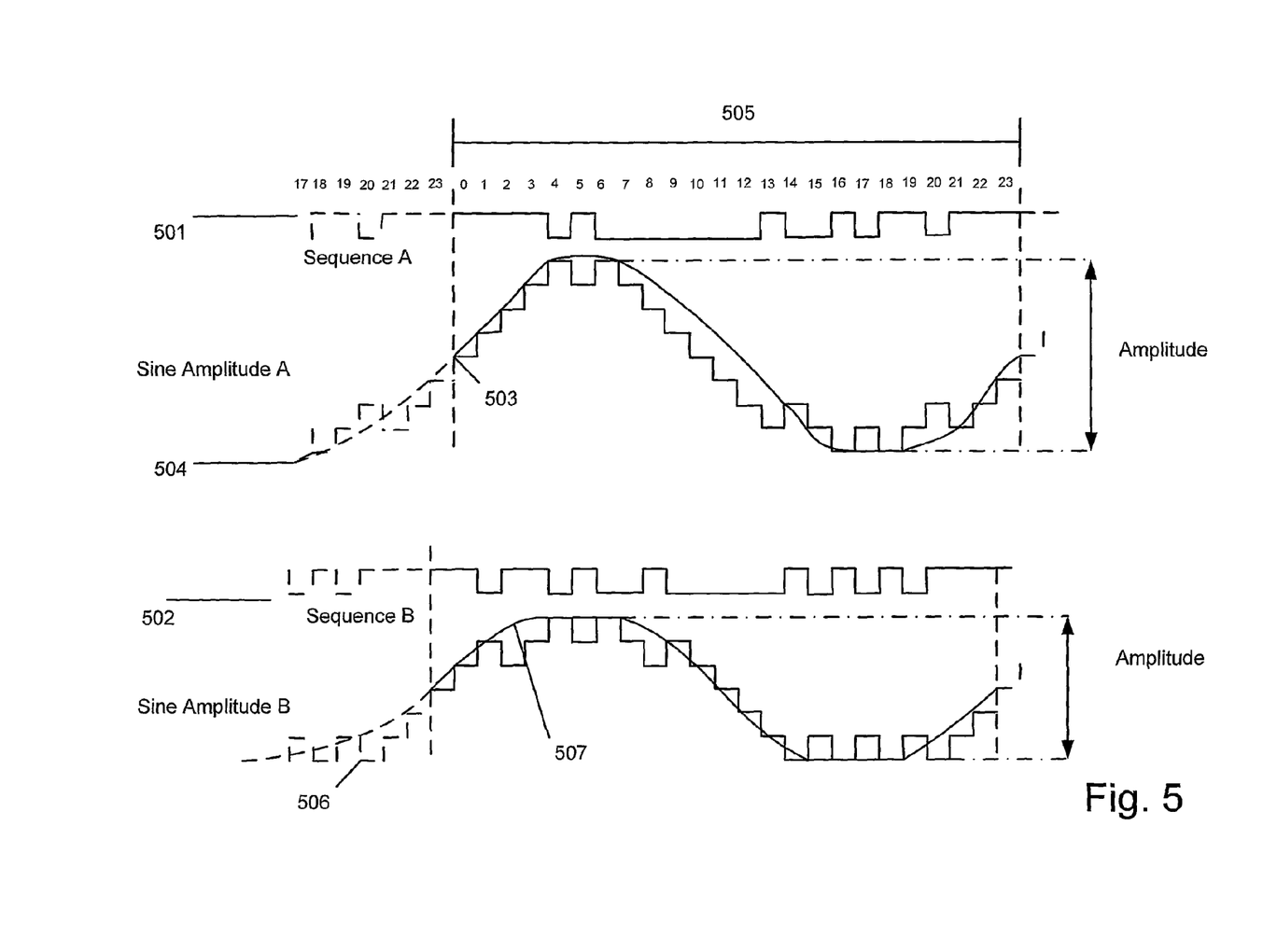
FIG. 5 shows an example of the sine wave pattern generated by an NFC communicator embodying the invention.

Once the digital sequences have been derived and stored within the NFC communicator 300, the digital sequences can be used by the selector/multiplexer 203 to generate digital signals which when processed by the antenna circuitry 120 result in the desired output waveform. FIG. 5 illustrates an example where a 24 digit sequence length and a 24× clock are used. Thus a cycle 505 of the carrier frequency comprises 24 clock cycles as shown.

FIG. 5 shows two examples based on two different digital sequences, digital sequences A 501 and B 502. The digital sequences are generally stored as a series of 1s and 0s which represent corresponding high and low signal levels. In the example shown digital sequence A is the following series of 1s and 0s: 000010000000010010110111, whereas digital sequence B is: 001001011011111010101000. The binary to multi-level converter 205 is configured so that one state of the digital signal causes a step change increase in output voltage and the other a step change decrease. As shown in FIG. 5, a 1 (or high level) of the digital sequence causes a stepped voltage increase and a zero (or low level) causes a stepped voltage decrease so that a series of 1s causes the output to ramp up and a series of 0s causes the output to ramp down, whereas alternate 1s and 0s causes the output to oscillate about a given voltage, so that digital sequences 501 and 502 result in stepped (or discrete) outputs 504 and 506 causing the antenna circuit to produce output waveforms 504 and 507, respectively. Thus, as can be seen from FIG. 5, by changing the digital sequence and therefore the digital signal, a change in amplitude of the produced output waveform may be obtained and one of the two output waveforms (for example 507) may be used to represent a 0 and the other (for example 503) used to represent a 1.

Thus, as can be seen from FIG. 5, within the NFC communicator different digital sequences can be used to achieve different amplitudes of output waveform and therefore provide the potential for modulation of a generated RF signal. For example, where digital sequence B in FIG. 5 represents a sine wave with an amplitude of 90% of the amplitude of a sine wave represented by digital sequence A, multiplexing the two digital sequences provide the ability to perform amplitude modulation. The actual percentage amplitude used may depend on the circumstances in question. For example, the combination used i.e. number of repeats of each digital sequence) will depend on the data to be transmitted, as supplied by the controller 101 along line 205 it may further depend on the degree of over-sampling—for example if clock 205 is capable of clocking at different frequencies. A combination of different digital sequences may also be used to compensate for variations in output signal level due to, for example: antenna type, the electromagnetic environment, or supply voltage variation.

By varying the digital sequences stored within the signal selector 200, flexibility can be obtained in relation to: the quality of output waveform generated by the NFC communicator 300, modulation depth/intensity, and modulation type. For example, different modulation depths/intensities or different types of modulation may be achieved by using different digital sequences. Such sequences may simply be loaded into memory by the controller 101, this provides greater flexibility when compared to conventional fixed hardware modulation systems.

The number of carrier frequency cycles or oversampling factor employed by any given signal selector 200 will depend both on the nature of the output waveform required and on the design complexity. Higher oversampling factors enable the production of purer output waveforms (that is a waveform with reduced harmonics).

To improve the quality of the output waveform further, the selector/multiplexer 203 may combine two (or more) digital sequences and provide the average of the resultant digital signals as the digital signal provided to the antenna circuitry 120. This has the effect of overlaying multiple waveforms on top of one another which enables a greater number of output waveforms to be produced and may reduce the effect of undesirable side frequencies. This may also mean that less filtering is required within the antenna circuitry (120) reducing the overall number of components and therefore the overall complexity and cost of the NFC communicator.

The signal selector 200 is shown in FIG. 3 as a discrete block comprising the counter 201, stored digital sequences 202 and selector/multiplexer 203. As an alternative some or all of the signal selector 200 may be comprised within the controller, within the data store or within other functionality 119. For example where the other functionality comprises a host device such as a mobile telephone, additional digital sequences may be made available (or supplied) to the signal selector when the NFC communicator 300 is attached to or manufactured with the host device. Such digital sequences may be used to compensate for environmental influences present within the host device or the environment it is likely to operate within, or alternatively such digital sequences may provide data necessary for operation in accordance with different communication protocols. As another example the counter may be provided by the controller. The digital sequences may be stored within the controller 101 and output to the selector/multiplexer 203 as required.

Where the digital sequences are held within programmable memory (whether as part of the signal selector or separately), digital sequences may be programmed into the memory as required.

As described above, the digital sequences are pre-generated and stored within the NFC communicator in the form of, for example a look-up table. As an alternative a series of algorithms may be used to generate the digital sequences, such algorithms being stored within the controller 101 or signal selector 200. Such algorithms may enable the NFC communicator 300 to alter the output waveform properties during operation, for example in response to changing environmental influences. For example the output waveform properties may be generated in response to input from a sense coil, as described in co-pending International patent application publication No. WO2006054070, the whole contents of which are hereby incorporated by reference. Alternatively in response to an RF signal received from a second near field RF communicator. For example by using such stored algorithms, the modulation index could be modified, or the quality of the output waveform could be modified (for example by switching from a 8× oversampling factor to a 24× oversampling factor).

The components of the near field RF communicators described above, if present, may be provided by a single semiconductor integrated circuit chip or by several separate chips, for example one or more silicon integrated circuits, or discrete devices mounted on a printed circuit board. Whether particular functions are implemented by analogue or digital circuitry will depend on the design route chosen. Antennas will be constructed in a form suitable for system and circuit requirements and may, as described above, be coils or could be dipoles or any other suitable form of antenna.

The functionality of the controller 101 is shown in FIG. 3 as being entirely within the NFC communicator. As other possibilities, the functionality of the controller 101 may be entirely within any host device controller or distributed between the near field RF communicator and the host device. As a further possibility, certain control functionality may reside within a separate unit which is attachable or removable or alternatively only used for certain transactions, for example a security device or ESD (External Security Device) which may only be used for payment transactions. Where the functionality of the controller 101 is within a separate unit or within any host device, then instead of the controller 101 the near field RF communicator will have a coupling, possibly including an appropriate interface, to that controller.

As shown in FIG. 3, the data store 118 comprises a memory within the near field RF communicator. As another possibility, the data store 118 may be comprised within any host device or shared or co-located memory device or data storage means. For example the data store may reside within the host device and all data may be centrally held within such host device. Alternatively data may be stored both within the near field RF communicator (for example data relevant to operation of the NFC functionality) and within a memory (not shown) within the host device (for example data relevant to the operation characteristics of the host device). The data storage means may be read only or may be read/write, depending upon whether data is to be written to as well as read from the data store.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention.

The invention claimed is:

1. A near field RF communicator comprising:
an antenna configured and operable to produce an RF signal to enable inductive coupling via a magnetic field of the RF signal between the antenna and another near field RF communicator in near field range; and
a signal generator configured and operable to generate a digital drive signal to cause the antenna to produce the RF signal, wherein the signal generator comprises a selector configured and operable to select a plurality of digital sequences to provide a plurality of digital signals from which the digital drive signal is generated.

2. The near field RF communicator according to claim 1, wherein the digital drive signal is a digital sine wave drive signal.

3. The near field RF communicator according to claim 1, wherein the signal generator is configured to generate the digital drive signal as a discretised representation of an oscillatory waveform with a sampling frequency greater than the frequency of the oscillatory waveform so that the discretised representation comprises series of increasing signal levels alternating with series of decreasing signal levels, wherein the sampling frequency is 8, 16 or 24 times the frequency of the oscillatory waveform.

4. The near field RF communicator according to claim 1, wherein at least one of: the selector is further configured to combine the digital sequences to generate the digital drive signal; and the selector is further configured to average the combined digital sequences to generate the digital drive signal.

5. The near field RF communicator according to claim 1, wherein at least one of:
the plurality of digital sequences are pre-stored in a store of the near field RF communicator; and
the plurality of digital sequences are stored in a look-up table.

6. The near field RF communicator according to claim 1, wherein the plurality of digital sequences are received from a host or an external device.

7. The near field RF communicator according to claim 1, wherein the selector is configured to repeatedly select the plurality of digital sequences to generate the digital drive signal as a sine wave signal.

8. The near field RF communicator according to claim 1, wherein the selector is configured to select elements of the plurality of digital sequences at a frequency determined by a clock signal.

9. The near field RF communicator according to claim 1, wherein the signal generator is configured to generate the digital drive signal so that a degree of over sampling is the same as or a multiple of a length of a digital sequence from the plurality of digital sequences.

10. The near field RF communicator according to claim 1, wherein the selector is further configured and operable to select digital sequences to alter the digital drive signal in response to changing environmental influences.

11. The near field RF communicator according to claim 1, wherein the signal generator is operable to generate the digital drive signal in accordance with data that is to be communicated by the near field RF communicator.

12. The near field RF communicator according to claim 1, wherein the selector is configured to select the plurality of digital sequences in accordance with data that is to be communicated by the near field RF communicator.

13. The near field RF communicator according to claim 1, wherein the near field RF communicator is at least one of an NFC communicator, and an RFID reader or transceiver.

14. The near field RF communicator according to claim 1, wherein the NFC communicator is operable under ISO/IEC 18092 and/or ISO/IEC 21481.

15. An electrical device comprising the near field RF communicator according to claim 1, wherein the near field RF communicator is integrated within or dispersed within the functionality of the electrical device.

16. The electrical device according to claim 15, wherein the near field RF communicator comprises at least one integrated circuit integrated within the electrical device.

17. The electrical device according to claim 15, wherein the device comprises at least one of a mobile telephone, a personal digital assistant, notebook, a personal or desk top computer, a computer peripheral, or a portable audio and/or video player.

18. A portable communications device incorporating the near field RF communicator according to claim 1.

19. The near field RF communicator according to claim 1, wherein the selector is configured to select and multiplex digital sequences representing different signal amplitudes to effect amplitude modulation.

20. A near field RF communicator comprising:
   an antenna operable to produce an RF signal to enable inductive coupling via a magnetic field of the RF signal between the antenna and another near field RF communicator or RF transponder in near field range; and
   a signal generator operable to generate a multi-level digital drive signal representing a sine wave to cause the antenna to produce the RF signal,
   wherein the signal generator comprises a selector operable to select plurality of digital sequences to provide plurality of digital signals from which the digital drive signal is generated.

\* \* \* \* \*

UNITED STATES PATENT AND TRADEMARK OFFICE
CERTIFICATE OF CORRECTION

PATENT NO. : 8,150,321 B2  
APPLICATION NO. : 12/377627  
DATED : April 3, 2012  
INVENTOR(S) : Winter et al.

It is certified that error appears in the above-identified patent and that said Letters Patent is hereby corrected as shown below:

Title Page
Item (76), please replace "Swinoon" with --Gloucestershire--.

Title Page
Item (76), please replace "Kemble" with --Gloucestershire--.

Title Page
Item (76), please replace "Cirencester" with --Gloucestershire--.

Signed and Sealed this  
Thirtieth Day of October, 2012

David J. Kappos  
*Director of the United States Patent and Trademark Office*